(12) United States Patent
Thier et al.

(10) Patent No.: US 9,691,105 B2
(45) Date of Patent: Jun. 27, 2017

(54) ANALYZING CALENDAR TO GENERATE FINANCIAL INFORMATION

(71) Applicants: Adam Thier, Pleasanton, CA (US);
Monica Bhat, Pleasanton, CA (US);
Laura DiTomasso, Lakeway, TX (US);
Matthew Harrison, Macclesfield (GB)

(72) Inventors: Adam Thier, Pleasanton, CA (US);
Monica Bhat, Pleasanton, CA (US);
Laura DiTomasso, Lakeway, TX (US);
Matthew Harrison, Macclesfield (GB)

(73) Assignee: SAP SE, Walldorf (DE)

( * ) Notice: Subject to any disclaimer, the term of this patent is extended or adjusted under 35 U.S.C. 154(b) by 561 days.

(21) Appl. No.: 14/254,658

(22) Filed: Apr. 16, 2014

(65) Prior Publication Data

US 2015/0302531 A1    Oct. 22, 2015

(51) Int. Cl.
| | | |
|---|---|---|
| *G07B 17/00* | (2006.01) | |
| *G07F 19/00* | (2006.01) | |
| *G06Q 40/00* | (2012.01) | |
| *G06Q 10/10* | (2012.01) | |

(52) U.S. Cl.
CPC ........... *G06Q 40/12* (2013.12); *G06Q 10/109* (2013.01); *G06Q 40/10* (2013.01)

(58) Field of Classification Search
None
See application file for complete search history.

(56) References Cited

U.S. PATENT DOCUMENTS

| | | |
|---|---|---|
| 7,969,306 B2 | 6/2011 | Ebert et al. |
| 8,352,303 B2 | 1/2013 | Lehmann et al. |
| 8,401,936 B2 | 3/2013 | Penning et al. |
| 8,412,549 B2 | 4/2013 | Graeber et al. |
| 8,442,850 B2 | 5/2013 | Schorr et al. |
| 8,498,915 B2 | 7/2013 | Eder |
| 8,521,613 B2 | 8/2013 | Erbey et al. |
| 8,583,784 B2 | 11/2013 | Lyon et al. |
| 8,656,181 B2 | 2/2014 | Balinsky et al. |
| 2002/0069145 A1* | 6/2002 | Collado ........... G06Q 10/06314 705/32 |
| 2002/0174006 A1 | 11/2002 | Rugge et al. |
| 2003/0040989 A1 | 2/2003 | Lee et al. |
| 2003/0069786 A1 | 4/2003 | Hoffman et al. |
| 2005/0097014 A1 | 5/2005 | Ebert |
| 2008/0059444 A1* | 3/2008 | Singh ................ G06F 17/30389 |

(Continued)

*Primary Examiner* — Ryan Zeender
*Assistant Examiner* — Christopher Buchanan
(74) *Attorney, Agent, or Firm* — Schwegman Lundberg & Woessner, P.A.

(57) ABSTRACT

Techniques of analyzing a calendar to generate financial information are disclosed. In some embodiments, scheduled event data for at least one scheduled event is extracted from an electronic calendar. The scheduled event data can comprise corresponding time data and text for each one of the at least one scheduled event. A financial accounting entry for each one of the at least one scheduled event can be generated based on the extracted scheduled event data. The financial accounting entry can comprise an electronic record of business-related activity that can be used for a financial accounting purpose. Generating the financial accounting entry can comprise populating the financial accounting entry using the time data of the corresponding scheduled event.

16 Claims, 16 Drawing Sheets

(56) References Cited

U.S. PATENT DOCUMENTS

| | | | |
|---|---|---|---|
| 2008/0215426 A1* | 9/2008 | Guldimann | G06Q 30/02 705/14.61 |
| 2010/0070555 A1* | 3/2010 | Duparc | G06Q 10/06 709/202 |
| 2011/0078016 A1 | 3/2011 | Wagenblatt et al. | |
| 2012/0254785 A1* | 10/2012 | Nakajo | G06F 21/6227 715/772 |
| 2013/0085907 A1 | 4/2013 | Cottingham et al. | |
| 2014/0067455 A1* | 3/2014 | Zhang | G06Q 10/109 705/7.24 |
| 2014/0310139 A1* | 10/2014 | Cornet | G06Q 40/125 705/32 |

\* cited by examiner

ANALYZING CALENDAR TO GENERATE FINANCIAL INFORMATION

TECHNICAL FIELD

The present application relates generally to the technical field of data processing, and, in various embodiments, to methods and systems of analyzing a calendar to generate financial information.

BACKGROUND

Although business users of electronic calendars can maintain a schedule of events in their electronic calendars, when it comes time to creating financial accounting entries corresponding to the events, the users have to manually enter the relevant information. This situation introduces two problems.

The first problem is redundancy in terms of input. The user enters the same details in at least two places, once in the calendar, and then again in an accounting entry (e.g., an expense report or a timesheet entry). Additionally, most of the current expense-entry applications require data entry by system codes, thereby introducing the potential for error due to wrong entries, sometimes due to user errors or incorrect code mapping. The incorrect mapping can cause exclusion of billable expenses or inclusion of incorrect expenses from invoices. Details like these can impact customer trust and future business prospects.

The second problem is the lack of a real-time cash forecast. Since the expense reports and timesheet entries are entered into the system only upon completion of the corresponding business operations, the business owner does not have a real-time view of upcoming expense and billing details. This lack of insight into key information related to major expenses can pose a major risk to the business.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 7 illustrates a GUI presenting an electronic timesheet, in accordance with some example embodiments;

FIG. 8 illustrates a GUI presenting an adjustment of attribute data of a timesheet, in accordance with some example embodiments;

DETAILED DESCRIPTION

Figure 1:
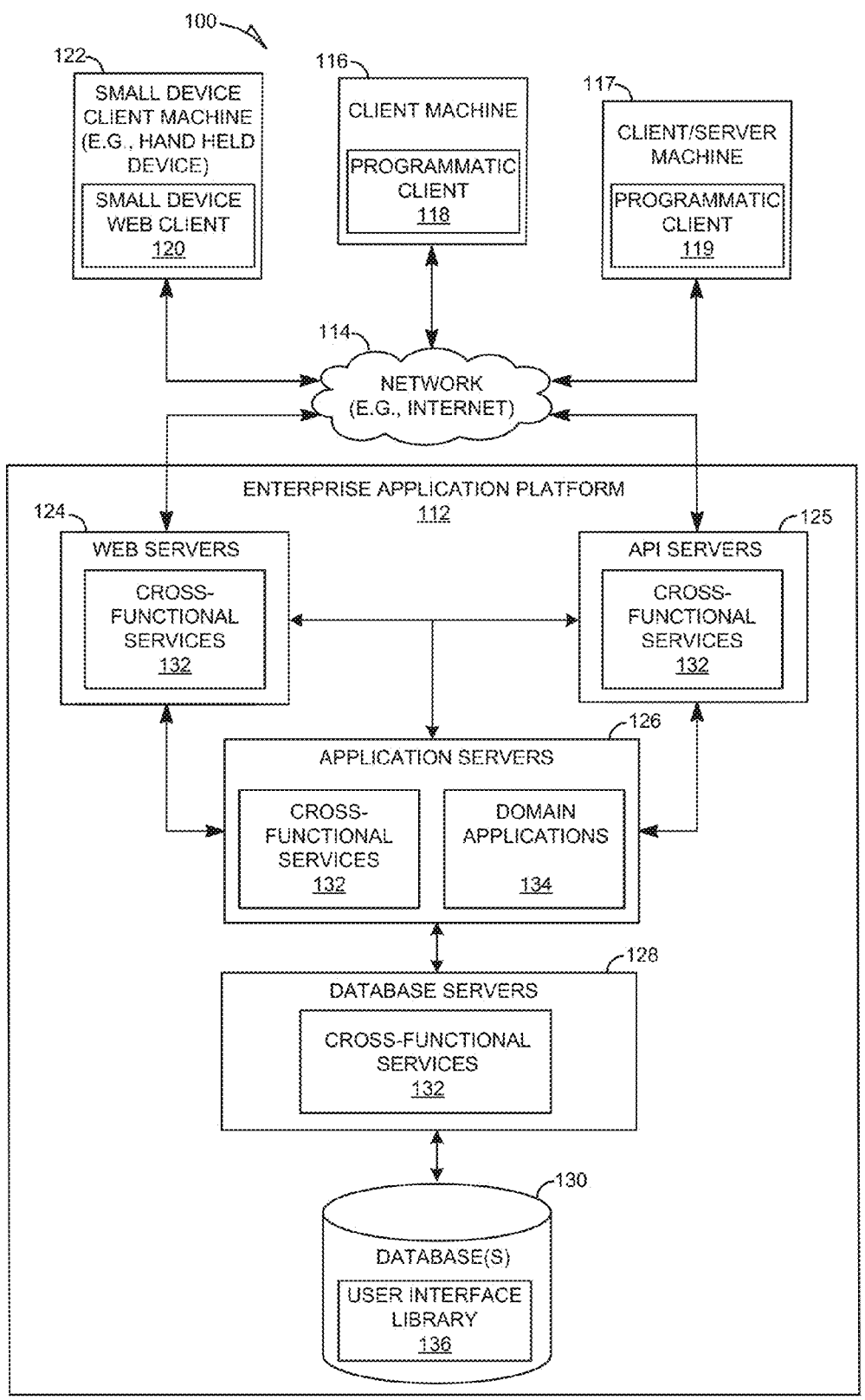
FIG. 1 is a network diagram illustrating a client-server system, in accordance with some example embodiments.

Example methods and systems of analyzing a calendar to generate financial information are described. In the following description, for purposes of explanation, numerous specific details are set forth in order to provide a thorough understanding of example embodiments. It will be evident, however, to one skilled in the art that the present embodiments can be practiced without these specific details.

The present disclosure introduces a high-performance, real-time (or near real-time) system to extract data from one or more electronic calendars for use in generating business-related activity and accounting information (e.g., pro-forma timesheets, pro-forma expense reports, and cash forecasts) based on text recognition and predictive analysis.

Small businesses—and large entities in high growth industries—often run on cash, and cash forecasting is a key aspect of financial management of such businesses. The business owner monitors cash inflow and outflow on a daily basis to avoid a crisis of liquidity in the near future. Since cash control is critical, the primary focus is accurate categorization of expenses in terms of non-billable (e.g., reimbursable) and billable (e.g., recovered from customer). A typical example of such business is the services industry, where customer billing details include expenses incurred while providing services to the customer. Examples of these expenses can be direct expenses (e.g., travel) or indirect expenses (e.g., a percentage of copier charge expenses). The customers, on their part, care about accurate representation of expenses charged to them based on agreed guidelines. Accurate customer billing helps generate cash in a timely manner, thus safeguarding short term viability and long term growth of the business.

The present disclosure introduces an accurate and reliable cash forecast in real-time (or near real-time), thereby aiding business owners in making optimal business decisions. The system of the present disclosure can remove redundancy and error by extracting the data from one or more electronic calendars, and using a text recognition algorithm to generate financial accounting entries and forecasts of financial or business-related activity.

In some example embodiments, scheduled event data for at least one scheduled event is extracted from an electronic calendar. The scheduled event data can comprise corresponding time data and text for each one of the at least one scheduled event. A financial accounting entry can be generated for each one of the at least one scheduled event based on the extracted scheduled event data.

In some example embodiments, generating the financial accounting entry comprises populating the financial accounting entry using the time data of the corresponding scheduled event.

In some example embodiments, generating the financial accounting entry comprises analyzing the text of the corresponding scheduled event based on a text analysis scheme, determining attribute data for the financial accounting entry based on the analysis of the text, and populating the financial accounting entry using the determined attribute data. In some example embodiments, the determined attribute data comprises at least one of an identification of a customer for the corresponding scheduled event and an identification of a project for the corresponding scheduled event. In some embodiments, the determined attribute data comprises an identification of a customer for the corresponding scheduled event and an identification of a project for the corresponding scheduled event, and the method further comprises determining an identification of an employee for the corresponding scheduled event, and determining a billing rate for the corresponding scheduled event based on the identification of the employee, the identification of the customer, and the identification of the project. In some example embodiments, the determination of attribute data is based on a stored association between the text and the attribute data. In some example embodiments, the text analysis scheme is stored. An indication of an adjustment to attribute data for the financial accounting entry can be received. The text analysis scheme can be modified based on the indication of the adjustment.

In some example embodiments, a forecast of business-related activity is generated using the financial accounting entry. In some example embodiments, an indication of a modification to the electronic calendar is received, and the forecast of business-related activity is modified based on the indication of the modification to the electronic calendar. In some example embodiments, the modification to the electronic calendar comprises at least one of an addition of a scheduled event, a deletion of a scheduled event, and a modification of scheduled event data of at least one of the at least one scheduled event.

The methods or embodiments disclosed herein may be implemented as a computer system having one or more modules (e.g., hardware modules or software modules). Such modules may be executed by one or more processors of the computer system. In some embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
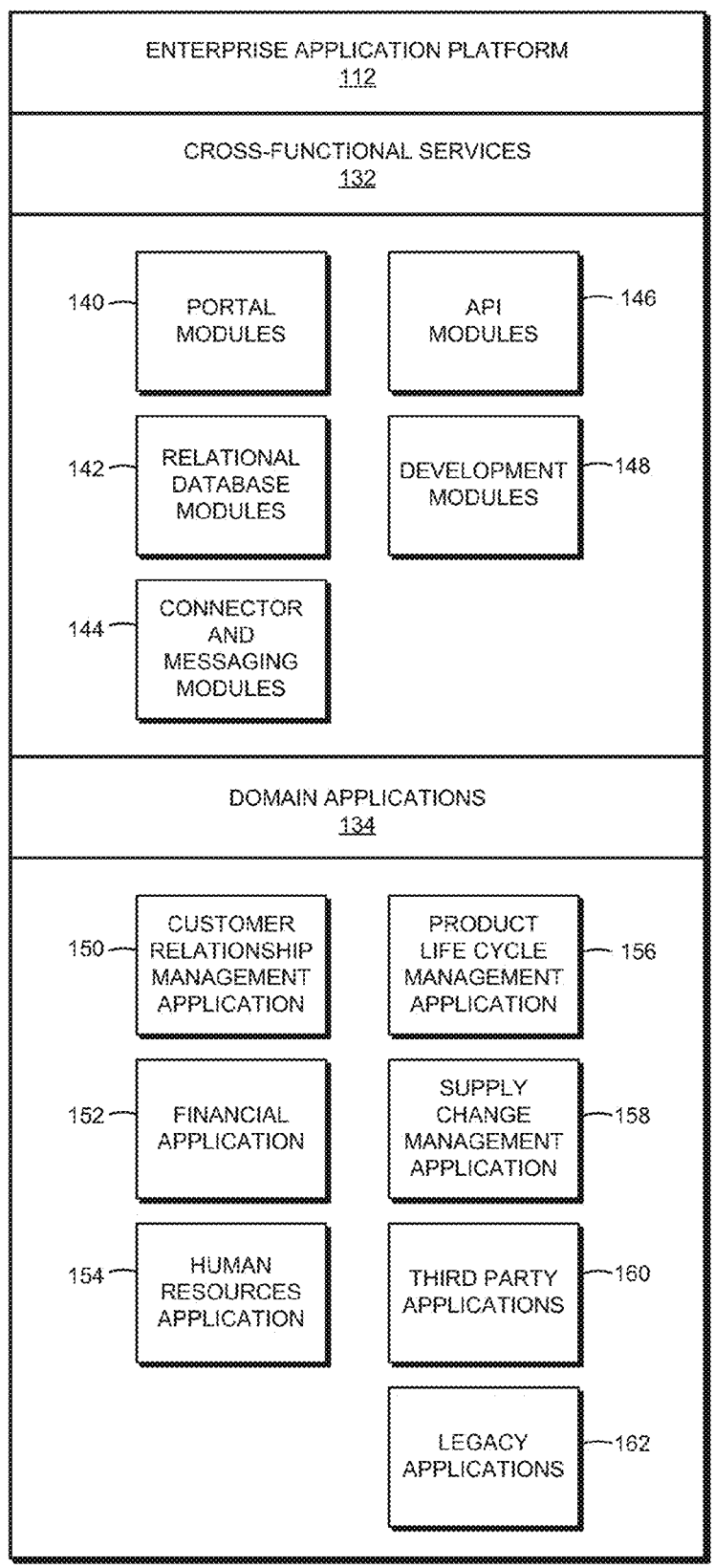
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
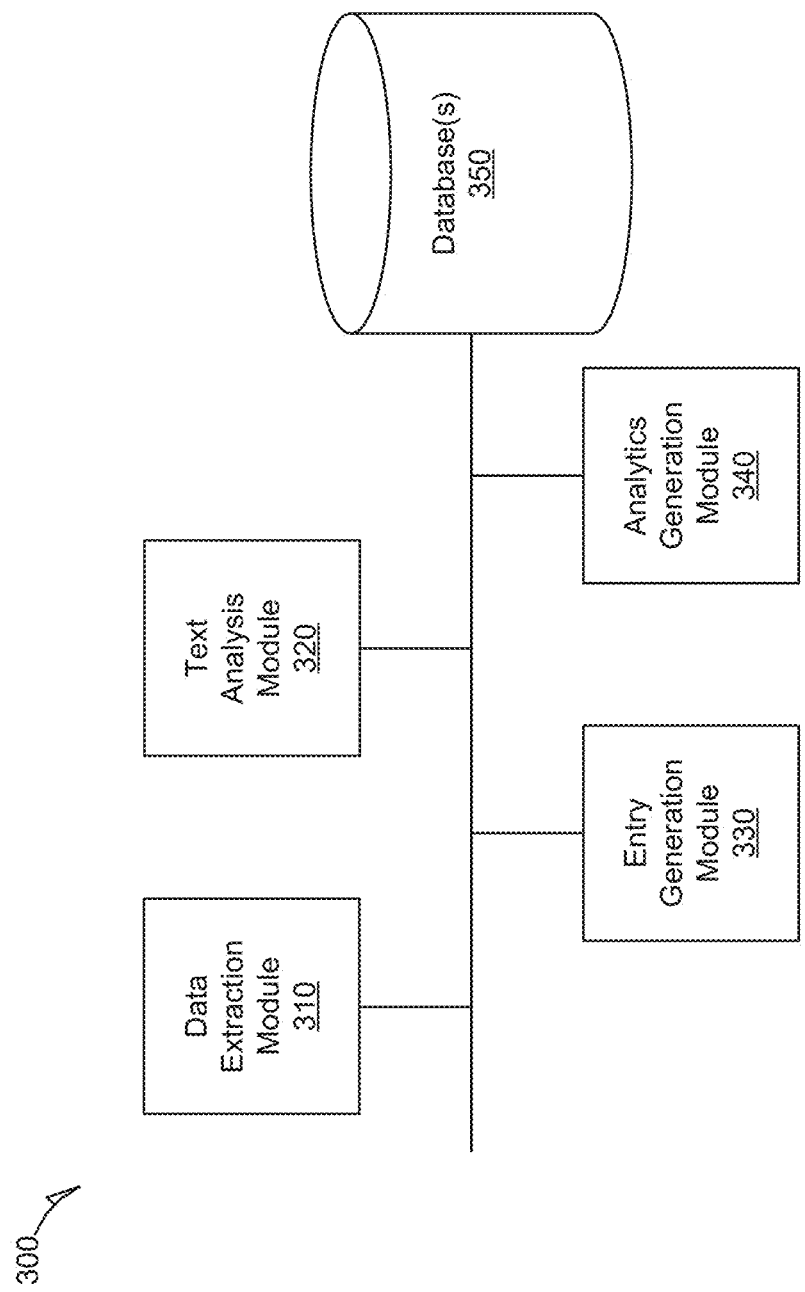
FIG. 3 is a block diagram illustrating a calendar analysis system, in accordance with some example embodiments.

FIG. 3 is a block diagram illustrating calendar analysis system 300, in accordance with an example embodiment. In some embodiments, the calendar analysis system 300 can comprise any combination of one or more of a data extraction module 310, a text analysis module 320, an entry generation module 330, and an analytics generation module 340. These modules 310, 320, 330, and 340 can reside on a machine having a memory and at least one processor (not shown). In some embodiments, these modules 310, 320, 330, and 340 can be incorporated into the enterprise application platform 112 in FIG. 1 (e.g., on application server(s) 126). However, it is contemplated that other configurations are also within the scope of the present disclosure. These modules 310, 320, 330, and 340 can be configured to perform operations with respect to data stored on one or more databases 350. In some embodiments, database(s) 350 can be incorporated into database(s) 130 in FIG. 1. However, it is contemplated that other configurations are also within the scope of the present disclosure.

In some example embodiments, the data extraction module 310 is configured to access an electronic calendar. The electronic calendar can comprise any calendaring software configured to schedule events. Examples of events include, but are not limited to, meetings, appointments, projects, and assignments. The electronic calendar can reside on a computing device of a user (e.g., an employee of a business). Examples of computing devices include, but are not limited to, a desktop computer, a laptop computer, a smartphone, and a tablet computer. The electronic calendar can also reside on a cloud platform accessible by the user via a computing device.

Figure 5:
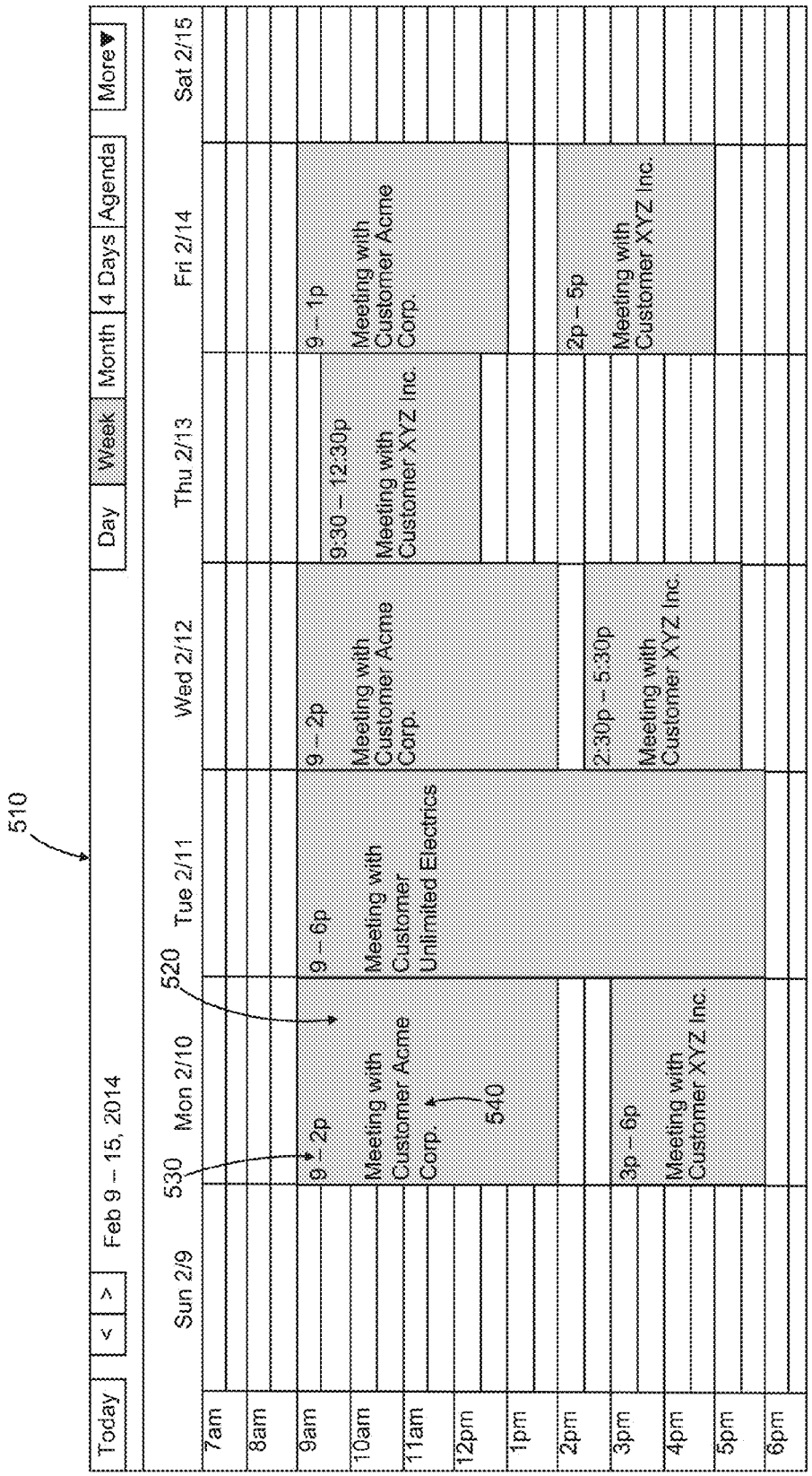
FIG. 5 illustrates a graphical user interface (GUI) presenting an electronic calendar, in accordance with some example embodiments.

FIG. 5 illustrates a GUI 510 presenting an electronic calendar on a display screen of a computing device, in accordance with some example embodiments. As seen in FIG. 5, the calendar can comprises a plurality of time slots (e.g., 7:00 am-7:30 am, 7:30 am-8:00 am, etc.) for a plurality of dates (e.g., Sunday 2/9, Monday 2/10, etc.). One or more time slots can be occupied by a scheduled event 520 assigned to the time slot(s). Each scheduled event 520 can have corresponding scheduled event data. The scheduled event data can comprise time data 530 for the scheduled event. The time data 530 for each scheduled event can comprise a uniform format. For example, the time data 530 can comprise a start time (e.g., 9 am) and an end time (e.g., 2 pm) for the scheduled event. Although FIG. 5 shows the time data 530 being displayed within the scheduled event 520, in some embodiments, the time data 530 is not displayed within the scheduled event 520.

Additionally, the scheduled event data can also comprise text 540. The text 540 can be any text entered by a user when creating the scheduled event 520. Accordingly, the text 540 does not need to follow a particular format. The user can enter any text 540 that he or she believes would be relevant to the scheduled event 520. In some embodiments, the text 540 includes any combination of one or more of an identification of an event type (e.g., a meeting, a travel event), a customer identification (e.g., customer name), and a project identification (e.g., a name of a project that will be worked on during the scheduled event 520).

Referring back to FIG. 3, the data extraction module 310 can extract the scheduled event data for at least one scheduled event 520 from the electronic calendar. In some embodiments, the data extraction module 310 extracts scheduled event data for a plurality of scheduled events that fall within a predetermined time frame (e.g., all events that are scheduled for the next 6 months). The data extraction module 310 can perform a synchronization process to extract scheduled event data from the calendar(s), thereby enabling the calendar analysis system 300 to take into account any updates to the calendar(s), including, but not limited to, the addition of one or more new scheduled events, the deletion/cancellation of one or more scheduled events, and the modification of one or more scheduled events (e.g., change of date, time, duration, project, and/or customer). In some embodiments, the data extraction module 310 is configured to perform the synchronization process on a periodic basis at configurable intervals (e.g., hourly, daily, weekly). In some embodiments, the data extraction module 310 is configured to perform the synchronization process on-demand in response to a request from a user (e.g., an authorized business user of the calendar analysis system 300). In some embodiments, the data extraction module 310 is configured to perform the synchronization process in response to a notification that a modification has been made to the calendar.

In some embodiments, the entry generation module 330 is configured to generate a financial accounting entry for one or more scheduled events 520 based on the corresponding extracted scheduled event data. In some embodiments, a financial accounting entry is an electronic record of business-related activity that can be used for financial accounting purposes (e.g., billing). The financial accounting entry can comprise a timesheet or an expense report. Other types of financial accounting entries are also within the scope of the present disclosure.

Figure 4:
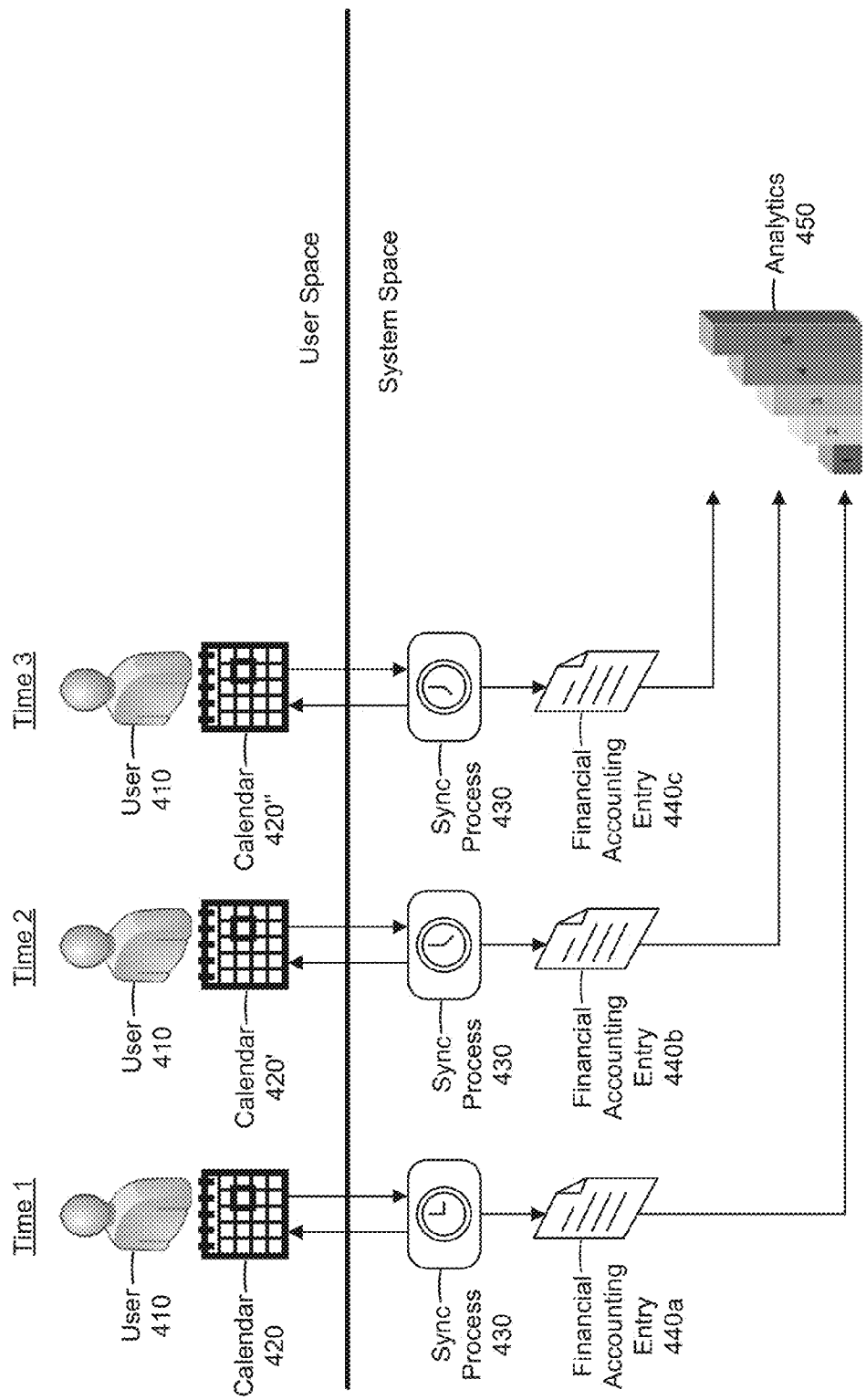
FIG. 4 is a diagram illustrating interactions between a calendar of a user in a user space and system processes in a system space at different times, in accordance with some example embodiments.

FIG. 4 is a diagram illustrating interactions between a calendar 420 of a user 410 in a user space and system processes in a system space at different times (Time 1, Time 2, and Time3), in accordance with some example embodiments. The user space can comprise a computing device (not shown) on which the calendar 420 resides. The system space can comprise the calendar analysis system 300 in FIG. 3.

At Time 1, a synchronization process 430 can be performed. In some embodiments, the synchronization process 430 comprises the calendar analysis system 300 extracting scheduled event data from the calendar 420, and generating a financial accounting entry 440a using the extracted scheduled event data. The data of the financial accounting entry 440a can be provided to and used by an analytics application 450. In some embodiments, the analytics application 450 is configured to generate a forecast of business-related activity using the financial accounting entry, as will be discussed later.

At a later Time 2, another synchronization process 430 can be performed. However, in between Time 1 and Time 2, a modification can be made to calendar 420, thereby forming an updated version 420' of calendar 420. Scheduled event data can be extracted from the updated version 420' and used to generate financial accounting entry 440b. The data of the financial accounting entry 440b can be provided to and used by an analytics application 450. In some embodiments where the modification to calendar 420 comprises the addition of a new scheduled event to the calendar 420, financial accounting entry 440b can be independent and distinct from financial accounting entry 440a. In some embodiments where the modification to calendar 420 comprises a modification of an existing scheduled event (e.g., changing the start time or end time of the event), financial accounting entry 440b can be a modification of financial accounting entry 440a.

At a later Time 3, another synchronization process 430 can be performed. However, in between Time 2 and Time 3, a modification can be made to calendar 420', thereby forming an updated version 420" of calendar 420'. Scheduled event data can be extracted from the updated version 420" and used to generate financial accounting entry 440c. The data of the financial accounting entry 440c can be provided to and used by an analytics application 450. In some embodiments where the modification to calendar 420' comprises the addition of a new scheduled event to the calendar 420', financial accounting entry 440c can be independent and distinct from financial accounting entry 440b. In some embodiments where the modification to calendar 420' comprises a modification of an existing scheduled event (e.g., changing the start time or end time of the event), financial accounting entry 440c can be a modification of financial accounting entry 440b.

Modifications to the calendar can include, but are not limited to, an adjustment or creation of travel expense details, an adjustment or creation of lunch expense details, and an adjustment or creation of car rental expense details. Other types of modifications are also within the scope of the present disclosure.

Figure 7:
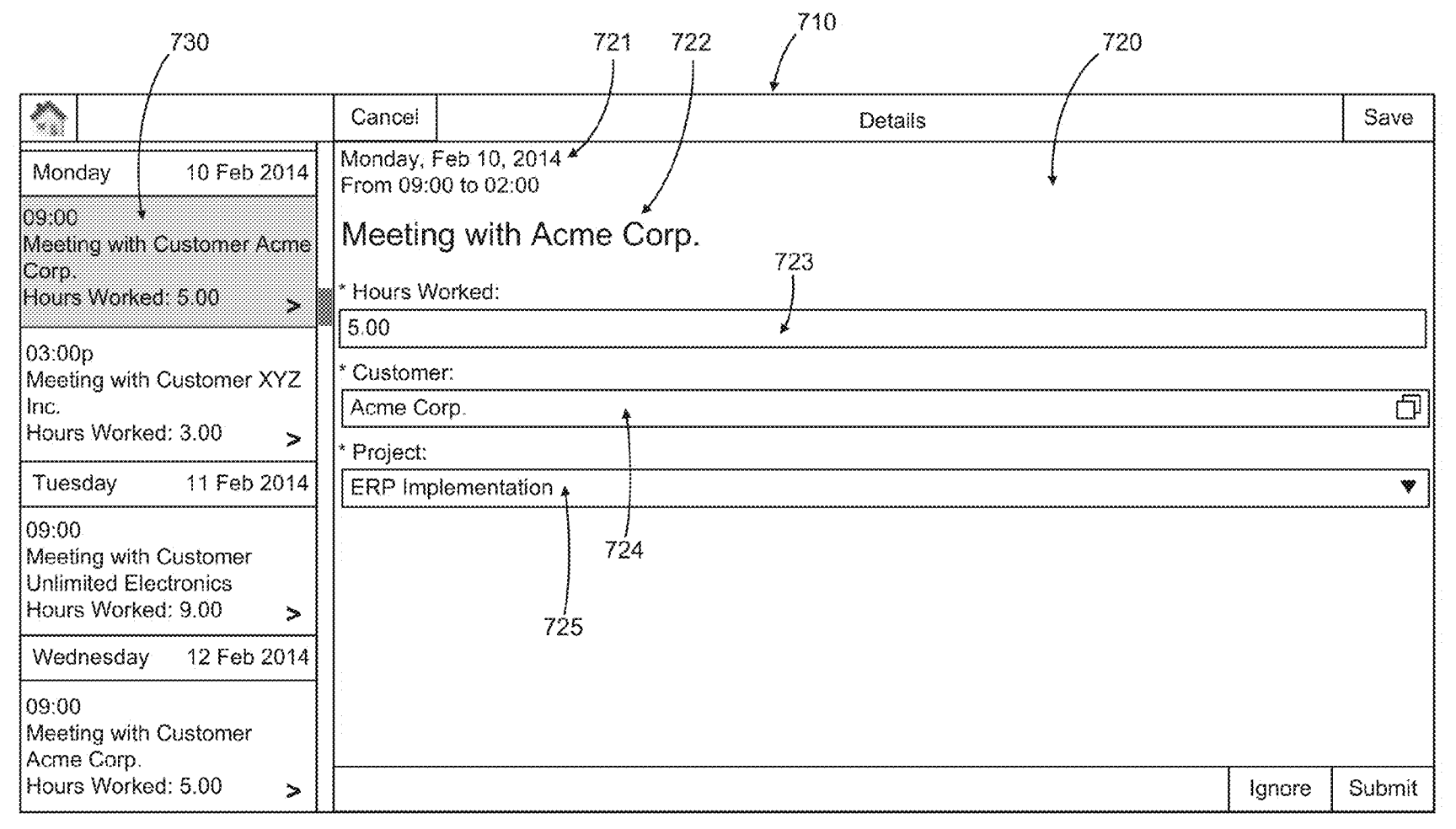

FIG. 7 illustrates a GUI 710 presenting an electronic timesheet 720, in accordance with some example embodiments. A menu or listing of selectable timesheet identifiers 730 can be displayed to the user, thereby allowing the user to select which one of the corresponding timesheets 720 to view. In some embodiments, the entry generation module 330 is configured to populate the electronic timesheet 720 using the time data 530 of the corresponding scheduled event 520. The electronic timesheet 720 can comprise a representation 721 of the time data 530 (e.g., Monday, Feb. 10, 2014 From 09:00 to 02:00) of the corresponding scheduled event 520, as well as an identification 722 of the corresponding scheduled event 520 (e.g., "Meeting with Acme Corp."). The entry generation module 330 can also be configured to determine attribute data for the electronic timesheet 720 using the extracted scheduled event data. The attribute data can include, but is not limited to, a number of hours worked (e.g., "5.00") in field 723, a customer identification (e.g., "Acme Corp.") in field 724, and a project identification ("ERP Implementation") in field 725.

Some attribute data can be determined simply from the calendar, without having to reference another source. For example, the data extraction module 310 can extract an identity of the user (e.g., employee) to which it the calendar belongs. The identity of the user can then be used by the calendar analysis system 300 to group financial accounting entries of the user for processing and analysis, as well as to determine other attribute data, such as a billing rate associated with the user that can be applied to any generation of forecasts involving the user.

Certain attribute data can be determined simply from the scheduled event data. The extracted time data 530 can be used to determine a duration of work (e.g., number of hours worked) for a scheduled event 520. For example, the duration of work (e.g., 5.00 hours) can be determined by calculating the difference between the start time (e.g., 9:00 am) of the extracted time data 530 and the end time (e.g., 2:00 pm) of the extracted time data 530.

Certain attribute data can be determined by analyzing the text 540 of the corresponding scheduled event 520 using a text analysis scheme. In some embodiments, the text analysis module 320 is configured to determine attribute data for a scheduled event 520 by analyzing the text 540 of the scheduled event 520 using a text analysis scheme. In some embodiments, the text analysis scheme uses a stored mapping of associations between text and attribute data. In some embodiments, the associations comprise rules or logic for recognizing attribute data. The associations can be stored and retrieved from the database(s) 350.

The text analysis module 320 can scan for certain words or phrases that are associated with certain types of attribute data or that are associated with the actual attribute data. For example, in scanning the text "Meeting with Customer Acme Corp.", the text analysis module 320 can recognize the use of the term "Customer" as indicating that the text following it (within a pre-defined distance, such as a certain number of words), "Acme Corp.", is customer identification data. This recognition can be determined based on stored text analysis logic or rules for recognizing attribute data.

In some embodiments, the text analysis module 320 can be configured to recognize that certain text is a certain type of attribute data using the stored associations. For example, the text analysis module 320 can be configured to recognize "Acme Corp." as being customer identification data, and populate the timesheet 720 with "Acme Corp." assigned to the customer identification field 724.

In some embodiments, the text analysis module 320 can be configured to personalize a text analysis for a specific user or a specific group of users. For example, the text analysis module 320 can be configured to recognize "AC" as customer identification attribute data "Acme Corp." for one user, but also as project identification attribute data "Service Air Conditioner" for another user.

In some embodiments, a text analysis scheme can be modified based on an adjustment or modification by a user (e.g., an employee whose calendar is being used for generation of the financial accounting entry) to attribute data on a financial accounting entry. For example, a text analysis scheme may originally be configured to recognize the text "AC" as customer identification attribute data "Acme Corp." However, the user may have intended the text "AC" in his or her scheduled event 520 to refer to a project identification of servicing an air conditioner. Therefore, upon reviewing the financial accounting entry having "Acme Corp." assigned to the customer identification attribute data field 724, the user can modify the financial accounting entry to remove the "Acme Corp." from the customer identification attribute data field 724 and assign "Service Air Conditioner" to the project identification attribute data field 725. The text analysis module 320 can then modify the text analysis scheme for the user based on this modification so that future use of the text "AC" in the scheduled event 520 by the user is interpreted by the text analysis scheme to refer to project identification attribute data "Service Air Conditioner." In this respect, the text analysis module 320 can learn over time to be more precise.

In some embodiments, the text analysis module 320 can prompt the user with questions to acquire additional attribute data for the financial accounting entry, such as "is this 'Customer1' travel or 'Customer1' lunch expense?"

Figure 8:
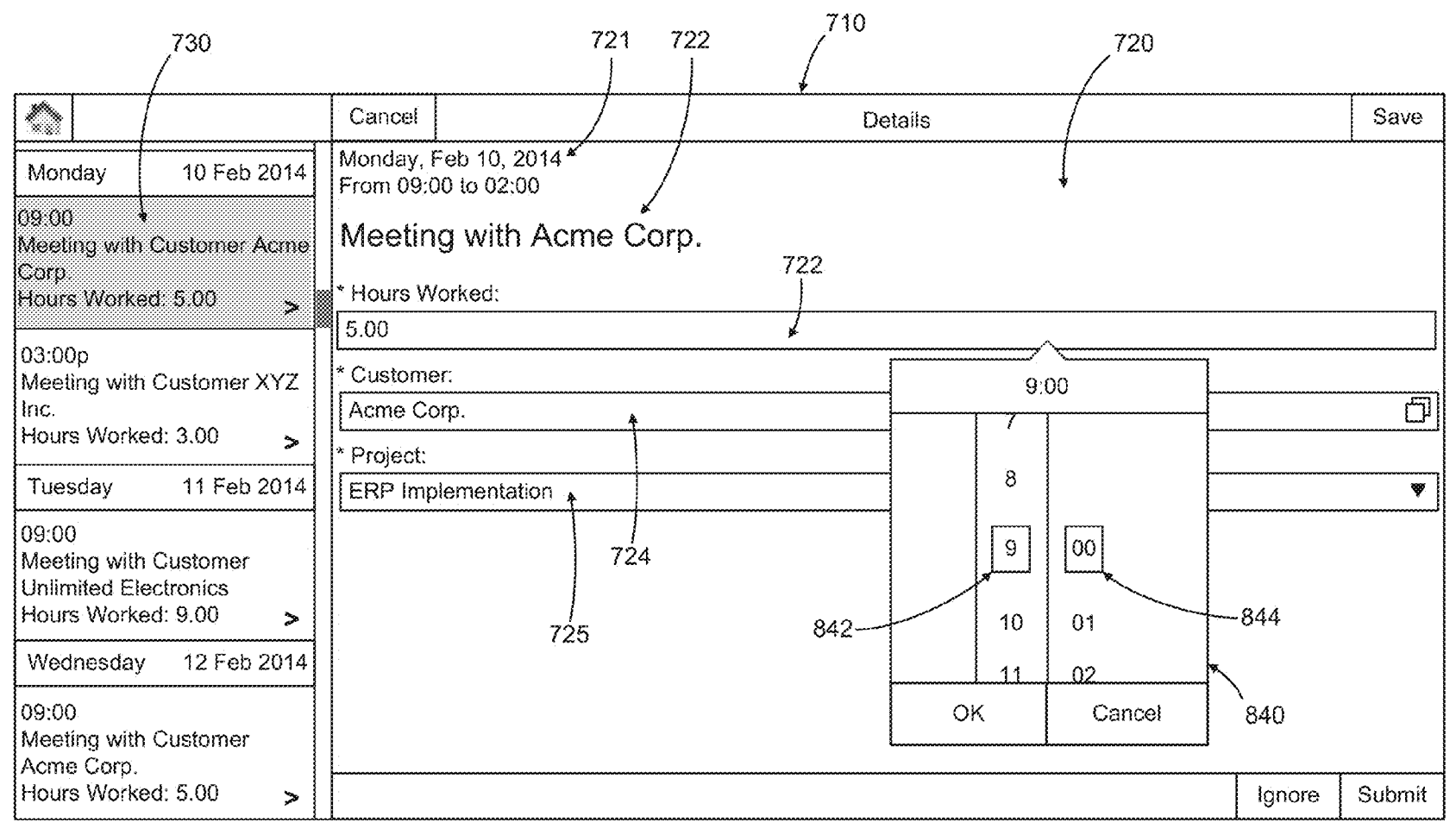

FIG. 8 illustrates the GUI 710 presenting an adjustment of attribute data of a timesheet 720, in accordance with some example embodiments. In this example, the user can select the "Hours Worked" attribute data field 723 for adjustment. In response to the user's selection, a graphical user interface element 840 can be displayed. The graphical user interface element 840 can comprise an adjustable hour element 842 and an adjustable minute element 844 to enable the user to adjust the hours worked for the corresponding scheduled event. In the example in FIG. 8, the user has adjusted the number of hours worked from "5.00" to "9.00."

When the user has finished reviewing the financial accounting entry, the user can submit the financial accounting entry for use by the calendar analysis system 300, such as in an analytics application (e.g., analytics application 450 in FIG. 4). Referring back to FIG. 3, the analytics generation module 340 can employ analytics application, and can be configured to use one or more submitted financial accounting entries to generate a forecast of business-related activity.

The calendar analysis system 300 adds significant value to owners and managers of businesses, enabling them to see an expense map generated from the calendar—by employee, customer, expense category, and/or project—however they want. They can easily understand their future cash outflows and recoverable expenses—so they can get ahead of the problems. For a small or medium business owner, the analytics generation module 340 can provide a real-time (or near real-time) balance sheet.

In some embodiments, the analytics generation module 340 can be configured to generate a cash forecast. Expense report data can be consolidated in operational pro-forma invoices for a customer, providing details about forecasted expense, revenue (billable expense), and cash using predictive analysis. A business owner or manager can select to forecast an estimated level of incoming cash based on past history, economic factors in growth of the business, or any basis that helps them visualize the business for a longer view. Since forecasts can be built using pro-forma invoices, the business user can get an aggregated view at different levels (for example, time, customer, employee, project, and organization).

Figure 9:
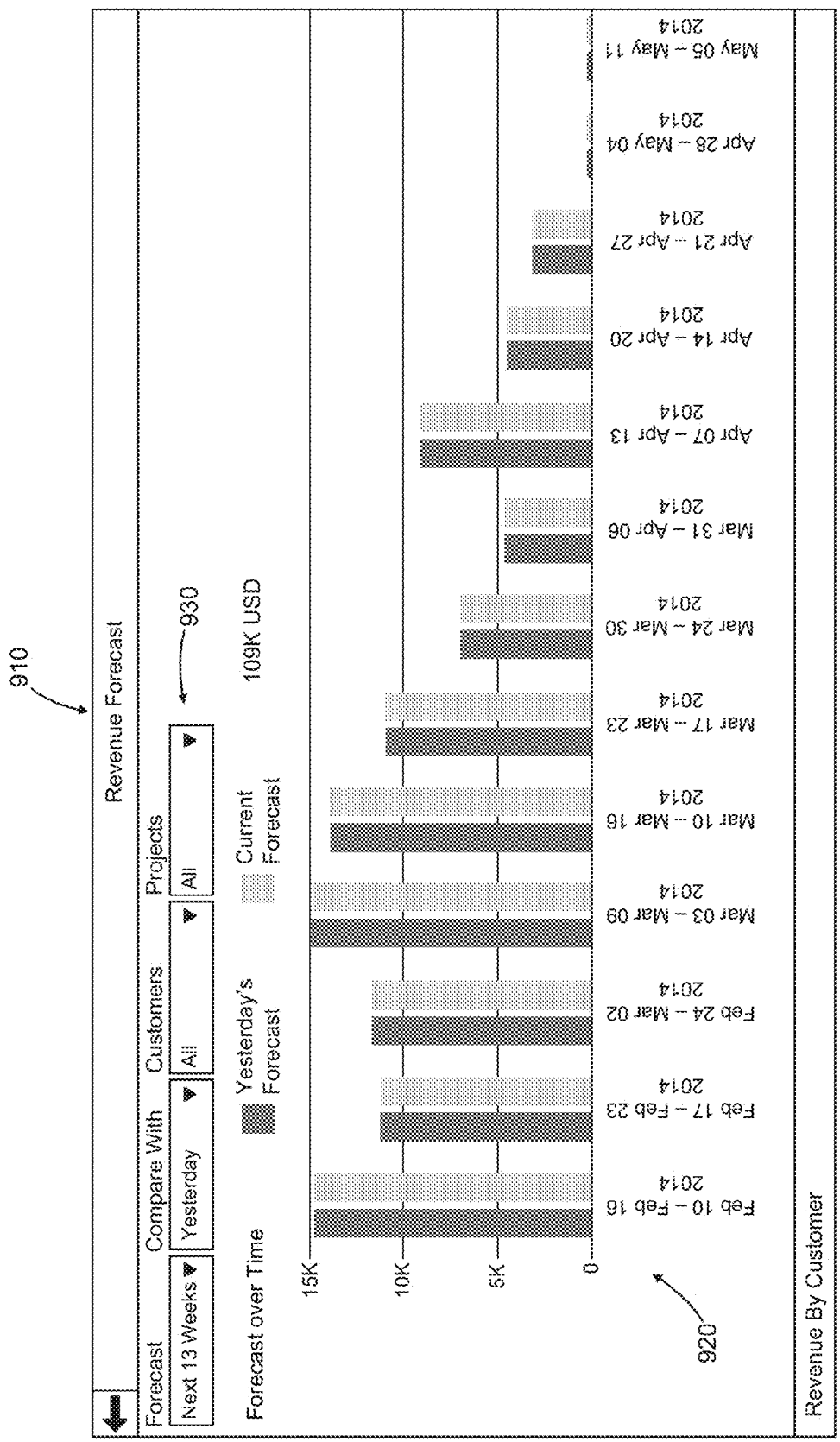
FIG. 9 illustrates a GUI presenting a forecast of business-related activity, in accordance with some example embodiments.

FIG. 9 illustrates a GUI 910 presenting a forecast 920 of business-related activity, in accordance with some example embodiments. In the example shown in FIG. 9, the forecast 920 can comprise information on the impact of calendar events and changes to calendar events on revenue for a business. This revenue impact forecast 920 can be generated based on the attribute data of financial accounting entries corresponding to one or more parameters. In some embodiments, the GUI 910 can comprise selectable parameter options 930. Examples of parameter options 930 include, but are not limited to, a forecast timeframe (e.g., "Next 13 Weeks"), a previous forecast for comparison with the current forecast 920 (e.g., forecast from "Yesterday"), an identification of the customers to which the financial accounting entries being used for the forecast 920 should correspond (e.g., "All"), and an identification of the projects to which the financial accounting entries being used for the forecast 920 should correspond.

In the example shown in FIG. 9, the forecast 920 shows a comparison of "Yesterday's Forecast" with the "Current Forecast" over the next 13 weeks for all customers and all projects. The data of the financial accounting entries can affect each forecast. For example, the identification of an employee corresponding to the financial accounting entry can be used to determine a corresponding revenue amount for the financial accounting entry (e.g., a timesheet for a meeting with a customer). The identification of the employee can be used to determine a billing rate for the employee's work. The number of hours worked in the financial accounting entry can be used along with a determined billing rate to calculate a corresponding revenue amount. Other factors and considerations can be incorporated into the determination of the forecast 920. For example, the identification of a project can influence a billing rate or can be used to add expenses (e.g., expenses for materials associated with the identified project). In the example shown in FIG. 9, the Yesterday's Forecast and the Current Forecast are identical, suggesting that no modifications have been made to the corresponding calendar(s) for the timeframe of the forecasts.

Figure 10:
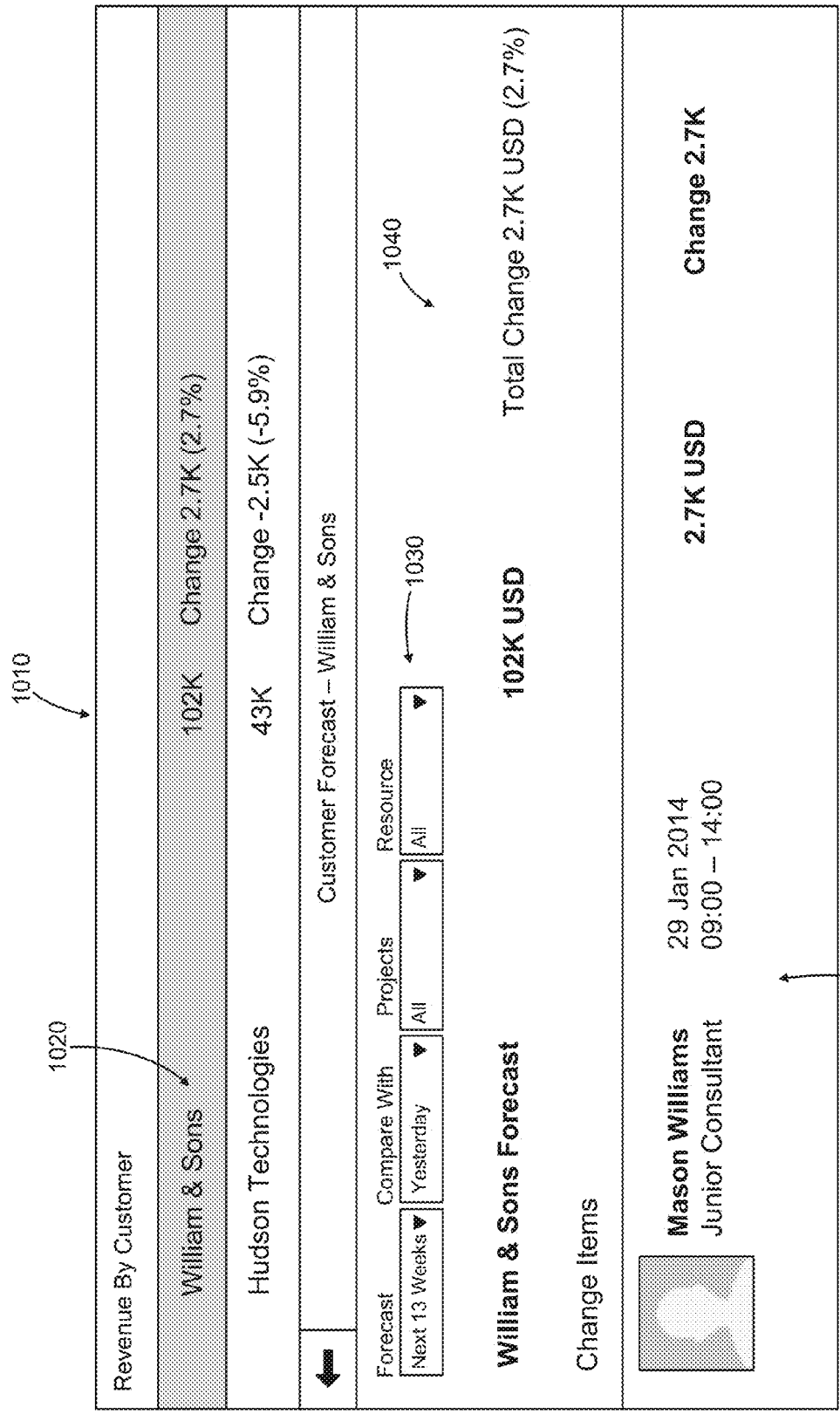
FIG. 10 illustrates a GUI presenting a forecast of business-related activity, in accordance with some example embodiments.

Modifications to the corresponding calendar(s) for the timeframe of the forecasts can affect the current forecast in a way that distinguishes it from previous forecasts. FIG. 10 illustrates a GUI 1010 presenting a forecast 1040 of business-related activity, in accordance with some example embodiments. Here the forecast 1040 shows the change in revenue, "2.7K USD (2.7%)," for a customer, "William & Sons" from a comparison of the current forecast with yesterday's forecast. The change in the forecast can be a result of a change in one or more calendars with respect to scheduled events or financial accounting entries for the corresponding customer. Selectable customer options 1020 can be presented to the user to enable the user to select which customer-related forecast to view.

The forecast 1040 can also include an identification 1045 of any changed items that have affected the change in revenue. The identification 1045 of changed items can include an identification of any employees that have made changes to their calendar or financial accounting entry (e.g., "Mason Williams"), an identification of the time period for which the change corresponds (e.g., "29 Jan. 2014", "09:00-14:00"), and an identification of the financial change corresponding to the change to the calendar or financial accounting entry (e.g., "2.7K USD").

In some embodiments, the GUI 1010 can also comprise selectable parameter options 1030. Examples of parameter options 1030 include, but are not limited to, a forecast timeframe (e.g., "Next 13 Weeks"), a previous forecast for comparison with the current forecast (e.g., forecast from "Yesterday"), an identification of the projects to which the financial accounting entries being used for the forecast 1040 should correspond (e.g., "All"), and any resources of the projects to which the financial accounting entries being used for the forecast 1040 should correspond (e.g., "All").

Figure 11:
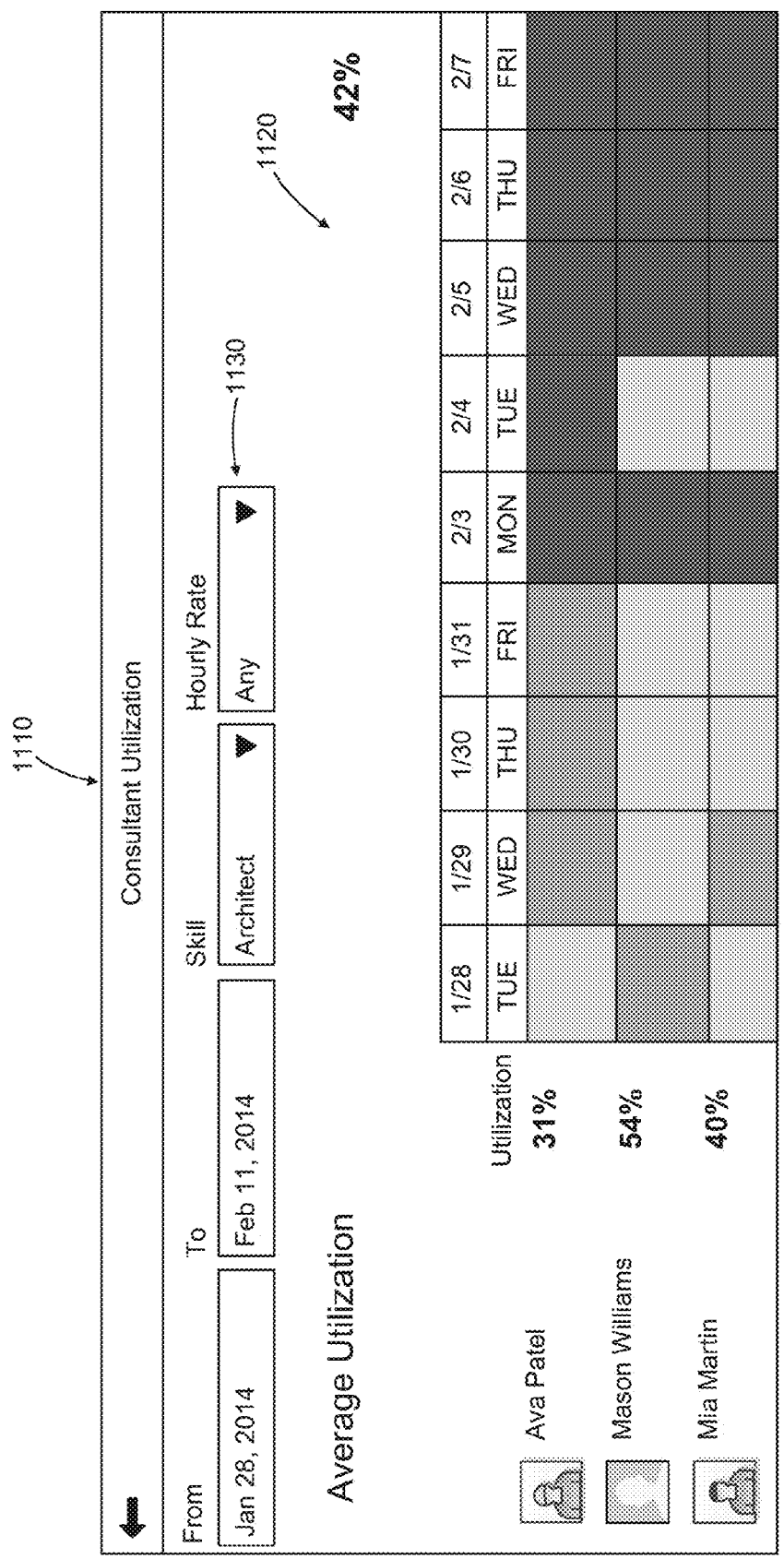
FIG. 11 illustrates a GUI presenting a forecast of business-related activity, in accordance with some example embodiments.

FIG. 11 illustrate a GUI 1110 presenting a forecast 1120 of business-related activity, in accordance with some example embodiments. In the example of FIG. 11, the forecast 1120 comprises a forecast of the utilization of employees of a business. In some embodiments, utilization is a measure of how much a resource (e.g., employee) is actually being used against the potential of how much the resource could be used. In some embodiments, this measure is based on a comparison of actual revenue scheduled to be earned versus potential revenue that could be scheduled to be earned. In some embodiments, this measure is based on a comparison of actual time scheduled to be worked versus potential time that could be scheduled to work.

In some embodiments, the GUI 1110 can comprise selectable parameter options 1130. Examples of parameter options 1130 include, but are not limited to, a forecast timeframe (e.g., From Jan. 28, 2014 To Feb. 11, 2014), an identification of what type of skilled employees to which the financial accounting entries being used for the forecast 1120 should correspond (e.g., "Architect"), and an identification of the hourly rate for the employees to which the financial accounting entries being used for the forecast 1120 should correspond.

The forecast 1120 can include corresponding utilization rates (e.g., 31%, 54%, 40%) for each employee (e.g., Ava Patel, Mason Williams, Mia Martin). The forecast 1120 can also include an average utilization rate (e.g., 42%) for all of the considered employees. The forecast 1120 can also include a table showing the utilization of each of the considered employees throughout the timeframe of the forecast. The different colors or shades can be used in the table to indicate or represent different levels of utilization (e.g., green indicates high utilization for a particular day during the timeframe of the forecast, yellow indicates medium utilization for a particular day during the timeframe of the forecast, and red indicates low utilization for a particular day during the timeframe of the forecast).

It is contemplated that other configurations and embodiments of forecasts can be generated and are within the scope of the present disclosure.

Figure 6:
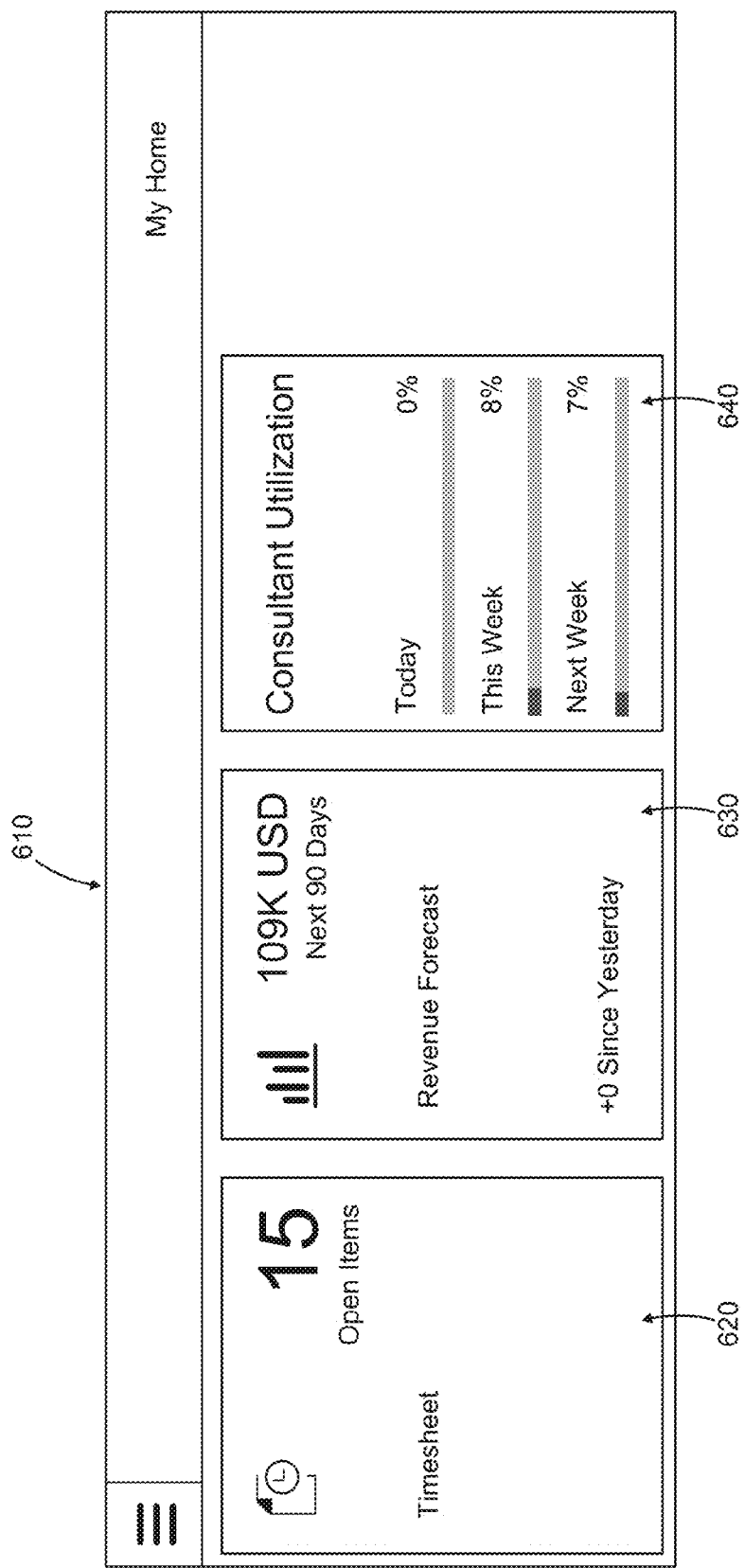
FIG. 6 illustrates a GUI presenting menu options, in accordance with some example embodiments.

FIG. 6 illustrates a GUI 610 presenting menu options, in accordance with some example embodiments. In the example in FIG. 6, the menu options comprise a selectable timesheet option 620, a selectable revenue forecast option 630, and a selectable utilization forecast option 640. The user can select the timesheet options 620 to be taken to the appropriate timesheets (e.g., only the user's timesheets if the user is a low-level employee; all employees' timesheets if the user is a manager or owner of the business). For example, selection of timesheet option 620 can result in the presentation of GUI 710 in FIG. 7. The user can select the revenue forecast options 630 to be taken to the appropriate revenue forecast. For example, selection of revenue forecast option 630 can result in the presentation of GUI 910 in FIG. 9. The user can select the utilization forecast options 640 to be taken to the utilization forecast. For example, selection of utilization forecast option 640 can result in the presentation of GUI 1110 in FIG. 11. Other menu option configurations are also within the scope of the present disclosure.

Figure 12:
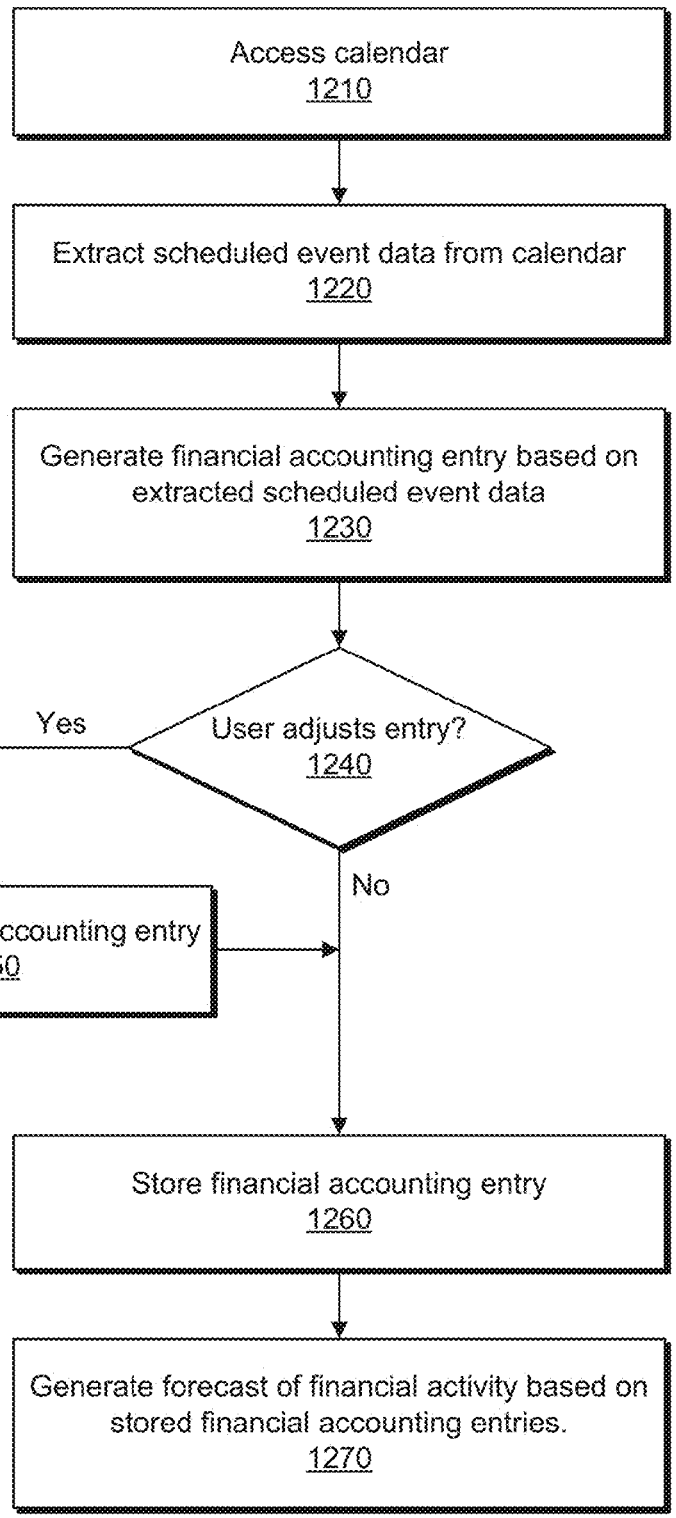
FIG. 12 is a flowchart illustrating a method, in accordance with some example embodiments.

FIG. 12 is a flowchart illustrating a method, in accordance with some embodiments. Method 1200 can be performed by processing logic that can comprise hardware (e.g., circuitry, dedicated logic, programmable logic, microcode, etc.), software (e.g., instructions run on a processing device), or a combination thereof. In one implementation, the method 1200 is performed by the calendar analysis system 300 of FIG. 3, or any combination of one or more of its modules, as described above. At operation 1210, an electronic calendar can be accessed. At operation 1220, scheduled event data for at least one scheduled event can be extracted from an electronic calendar. The scheduled event data can comprise corresponding time data and text for each one the scheduled events. At operation 1230, a financial accounting entry can be generated for the scheduled event(s) based on the extracted scheduled event data. At operation 1240, it can be determined whether or not a user has requested an adjustment or a modification to any of the financial accounting entries. In some embodiments, the adjustment or modification to a financial accounting entry can comprise an adjustment or modification of attribute data (e.g., change in hours worked, customer identification, project identification) of the financial accounting entry. If it is determined that a user has not requested an adjustment or modification to a financial accounting entry, then, at operation 1260, the financial accounting entry can be stored. If it is determined that a user has requested an adjustment or modification to a financial accounting entry, then, at operation 1250, the adjustment or modification can be made. The adjusted or modified financial accounting entry can then be stored, at operation 1260. At operation 1270, a forecast of business-related activity can be generated using one or more of the stored financial accounting entries. It is contemplated that any of the other features described within the present disclosure can be incorporated into method 1200.

Figure 13:
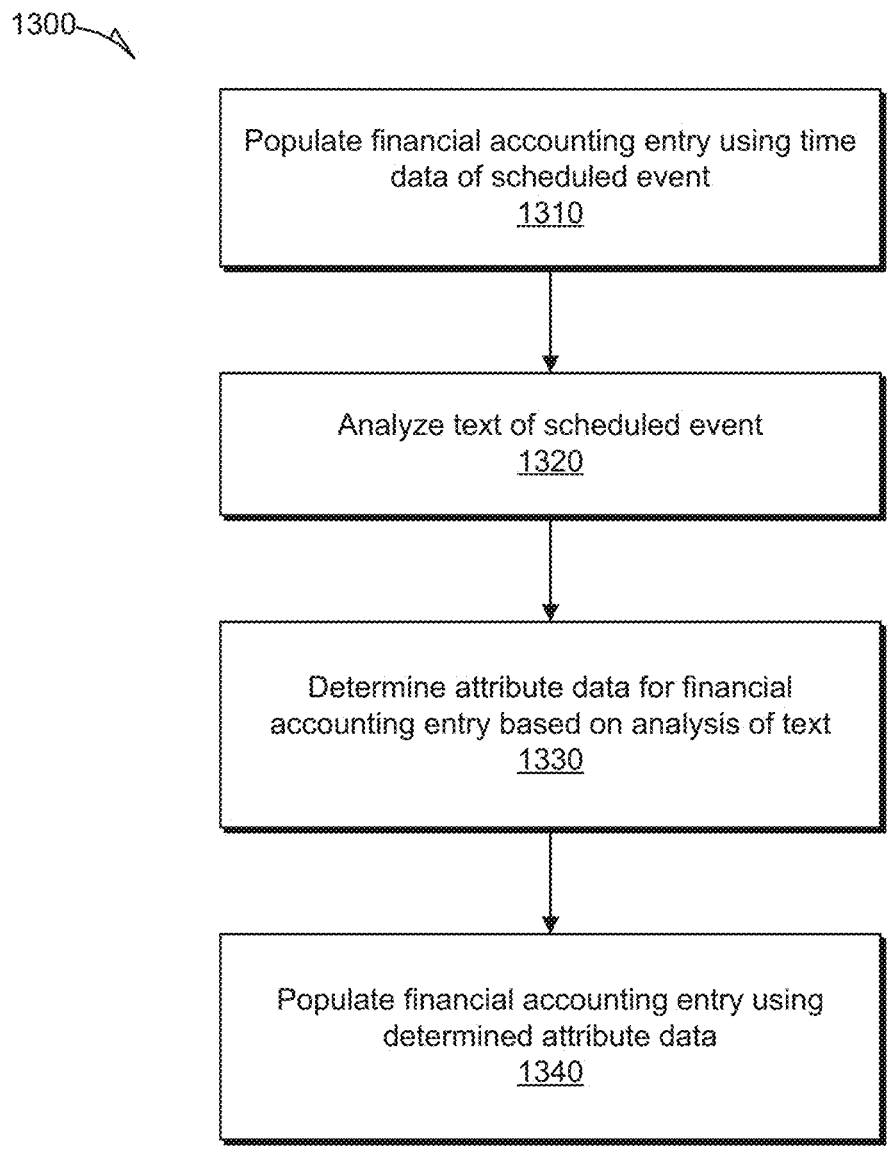
FIG. 13 is a flowchart illustrating a method, in accordance with some example embodiments.

FIG. 13 is a flowchart illustrating a method, in accordance with some embodiments. Method 1300 can be performed by processing logic that can comprise hardware (e.g., circuitry, dedicated logic, programmable logic, microcode, etc.), software (e.g., instructions run on a processing device), or a combination thereof. In one implementation, the method 1300 is performed by the calendar analysis system 300 of FIG. 3, or any combination of one or more of its modules, as described above. At operation 1310, the financial accounting entry can be populated using the time data of the corresponding scheduled event. At operation 1320, the text of the corresponding scheduled event can be analyzed using a text analysis scheme. At operation 1330, attribute data for the financial accounting entry can be determined based on the analysis of the text. At operation 1340, the financial accounting entry can be populated using the determined attribute data. In some example embodiments, the determined attribute data comprises at least one of an identification of a customer for the corresponding scheduled event and an identification of a project for the corresponding scheduled event.

In some embodiments, the determined attribute data comprises an identification of a customer for the corresponding scheduled event and an identification of a project for the corresponding scheduled event, and the method further comprises determining an identification of an employee for the corresponding scheduled event, and determining a billing rate for the corresponding scheduled event based on the identification of the employee, the identification of the customer, and the identification of the project.

In some example embodiments, the determination of attribute data is based on a stored association between the text and the attribute data. It is contemplated that any of the other features described within the present disclosure can be incorporated into method 1300.

Figure 14:
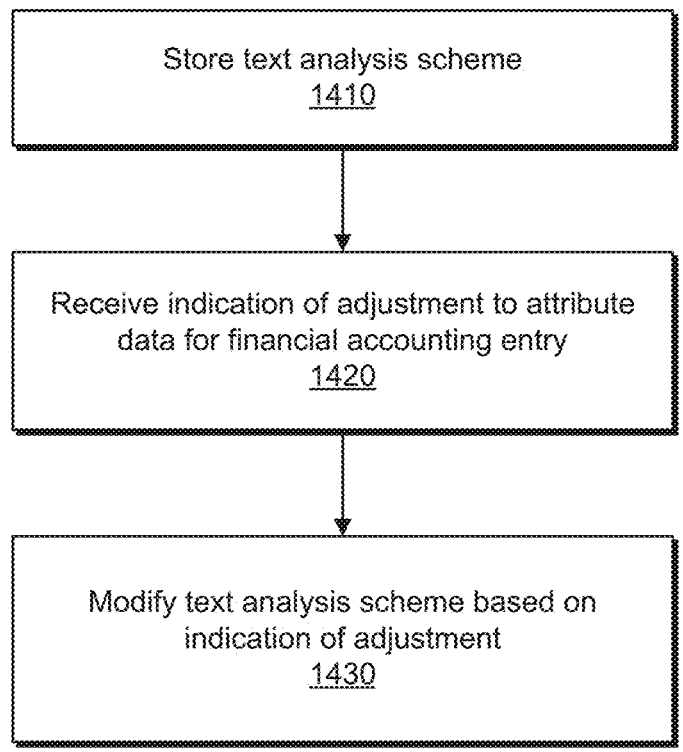
FIG. 14 is a flowchart illustrating a method, in accordance with some example embodiments.

FIG. 14 is a flowchart illustrating a method, in accordance with some embodiments. Method 1400 can be performed by processing logic that can comprise hardware (e.g., circuitry, dedicated logic, programmable logic, microcode, etc.), software (e.g., instructions run on a processing device), or a combination thereof. In one implementation, the method 1400 is performed by the calendar analysis system 300 of FIG. 3, or any combination of one or more of its modules, as described above. At operation 1410, associations between text and potential attribute data for financial accounting entries can be stored. These associations can be used as part of the semantic text analysis of the text 540 of a scheduled event 520 in order to populate a financial accounting entry for the scheduled event 520. At operation 1420, an indication of an adjustment to attribute data for a financial accounting entry can be received. For example, a user can change the customer identification in field 724 in FIG. 7. Accordingly, an indication of this change can be received. At operation 1430, one or more of the stored associations can be modified based on the indication of the adjustment. In this respect, the calendar analysis system 300 can learn the intended attribute data for certain text used by a user, and then make adjustments to how it populates financial accounting entries for that user based on the newly discover intended attribute data. It is contemplated that any of the other features described within the present disclosure can be incorporated into method 1400.

Figure 15:
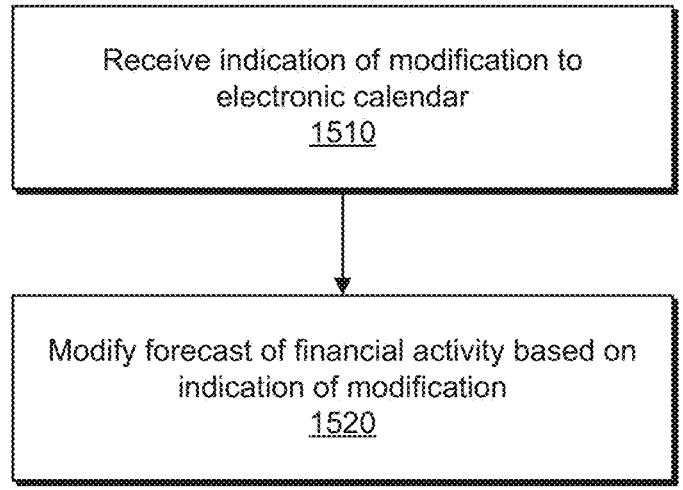
FIG. 15 is a flowchart illustrating a method, in accordance with some example embodiments.

FIG. 15 is a flowchart illustrating a method, in accordance with some embodiments. Method 1500 can be performed by processing logic that can comprise hardware (e.g., circuitry, dedicated logic, programmable logic, microcode, etc.), software (e.g., instructions run on a processing device), or a combination thereof. In one implementation, the method 1500 is performed by the calendar analysis system 300 of FIG. 3, or any combination of one or more of its modules, as described above. At operation 1510, an indication of a modification to the electronic calendar can be received. In some example embodiments, the modification to the electronic calendar comprises at least one of an addition of a scheduled event, a deletion of a scheduled event, and a modification of scheduled event data of at least one of the at least one scheduled event. At operation 1520, a forecast of business-related activity is modified based on the indication of the modification to the electronic calendar. It is contemplated that any of the other features described within the present disclosure can be incorporated into method 1500.

The present disclosure introduces the technique of importing calendar data as the source of primary business activity data for a service organization. Fuzzy text analysis of the activity data can be used to generate pro-forma timesheets and expense reports. Errors and delays can be eliminated by removing redundancy of multiple user inputs across disparate systems. Real-time (or near real-time) and accurate cash forecast across different levels of an organization can be provided based on future appointments or commitments. The system of the present disclosure can use natural language processes to eliminate redundant data input and remove latency on tracking expense transactions. It can accesses an employee's calendar and translate the employee's activities into pro-forma time sheets or expense reports for revenue (billable) and expense (reimbursable) projections. With mobile access, a business manager can make optimal decisions with the accurate expense planning in real-time (or near real-time). The system can also free up a business's resources to service its customers and improve the accuracy of the data by eliminating redundant manual inputs and incorrect expense classifications. The techniques of the present disclosure can enable and provide real-time (or near real-time) expense planning and forecasting, real-time (or near real-time) cash forecasting, and optimized vendor management based on past and future expense data. The techniques of the present disclosure can also be used in the services industry for tracking expenses for billable projects, as well as in high-tech industries for tracking expenses by activities. They can remove latency and promote visibility, as well as remove redundant manual inputs across multiple systems. They can also streamline downstream processes (e.g., customer billing) with better data accuracy.

Example Mobile Device

Figure 16:
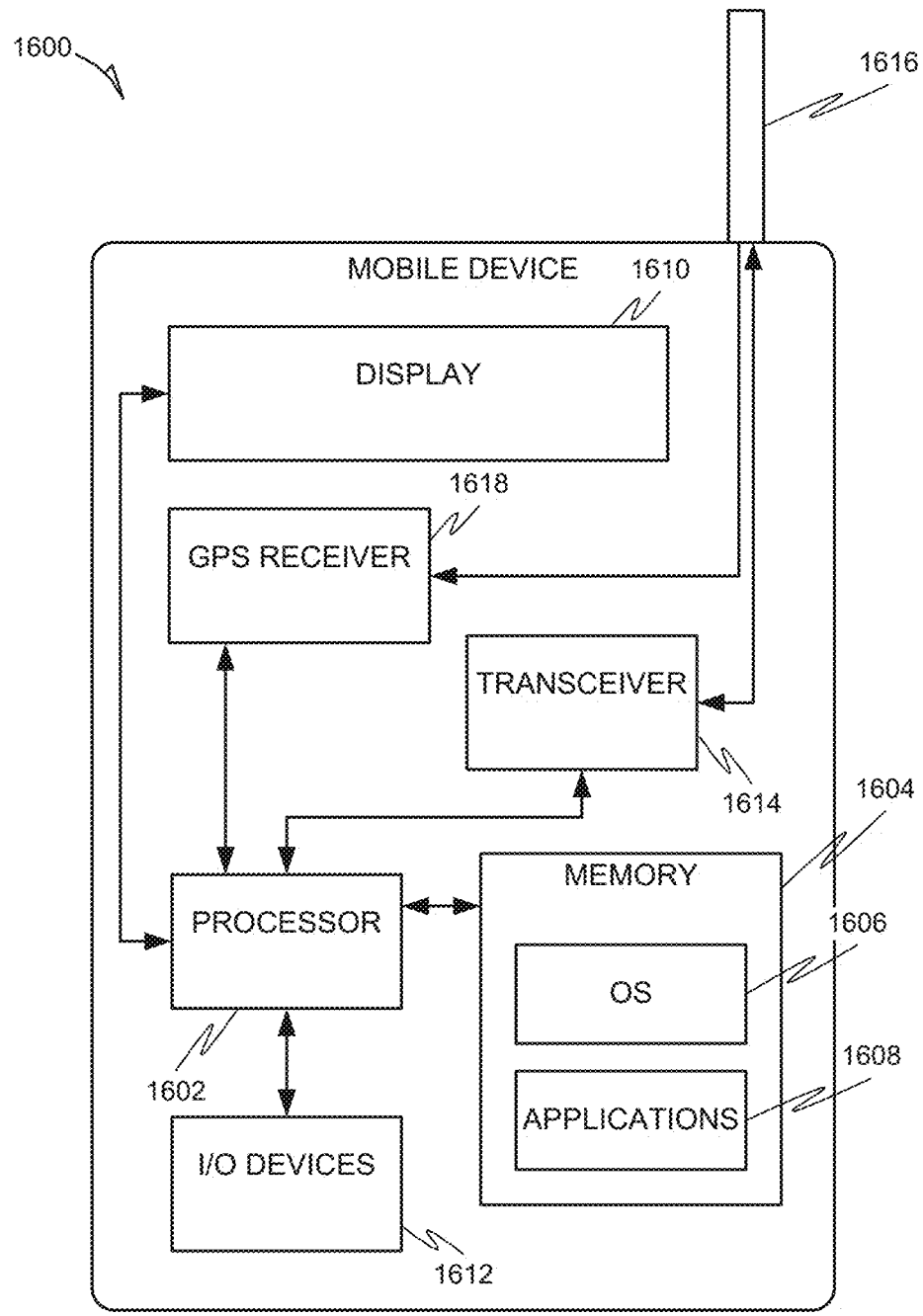
FIG. 16 is a block diagram illustrating a mobile device, in accordance with some example embodiments.

FIG. 16 is a block diagram illustrating a mobile device 1600, according to an example embodiment. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location enabled application that can provide LBSs to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Modules, Components and Logic

Certain embodiments are described herein as including logic or a number of components, modules, or mechanisms.

Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 17:
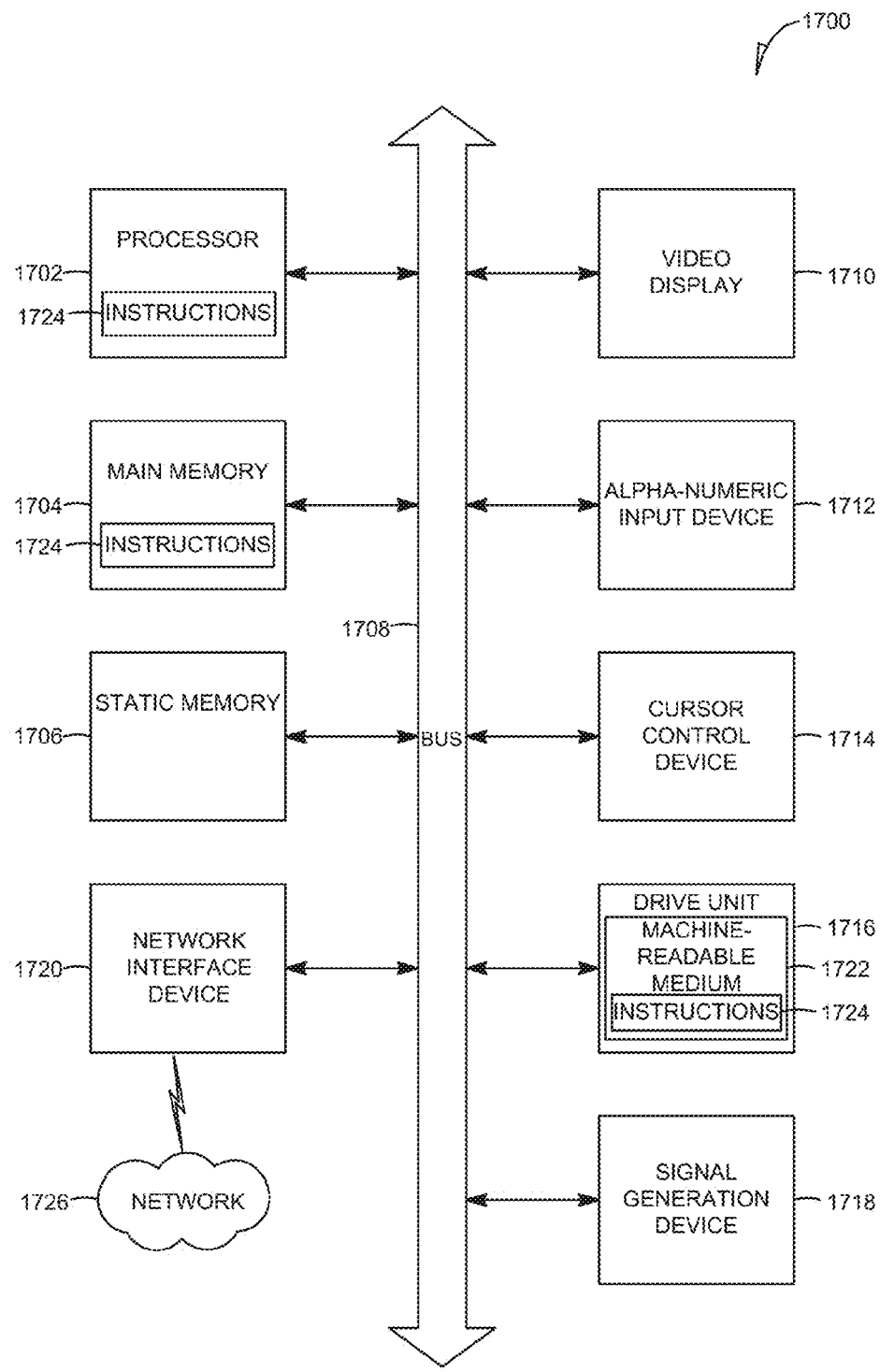
FIG. 17 is a block diagram of an example computer system on which methodologies described herein can be executed, in accordance with some example embodiments.

FIG. 17 is a block diagram of a machine in the example form of a computer system 1700 within which instructions 1724 for causing the machine to perform any one or more of the methodologies discussed herein can be executed, in accordance with an example embodiment. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 can further include a video display unit 1710 (e.g., a liquid crystal display (LCD) or a cathode ray tube (CRT)). The computer system 1700 also includes an alphanumeric input device 1712 (e.g., a keyboard), a user interface (UI) navigation (or cursor control) device 1714 (e.g., a mouse), a disk drive unit 1716, a signal generation device 1718 (e.g., a speaker) and a network interface device 1720.

The disk drive unit 1716 includes a machine-readable medium 1722 on which is stored one or more sets of data structures and instructions 1724 (e.g., software) embodying or utilized by any one or more of the methodologies or functions described herein. The instructions 1724 can also reside, completely or at least partially, within the main memory 1704 and/or within the processor 1702 during execution thereof by the computer system 1700, the main memory 1704 and the processor 1702 also constituting machine-readable media. The instructions 1724 can also reside, completely or at least partially, within the static memory 1706.

While the machine-readable medium 1722 is shown in an example embodiment to be a single medium, the term "machine-readable medium" can include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1724 can further be transmitted or received over a communications network 1726 using a transmission medium. The instructions 1724 can be transmitted using the network interface device 1720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   extracting scheduled event data for at least one scheduled event from an electronic calendar, the scheduled event data comprising corresponding time data and text for each one of the at least one scheduled event;
   generating, by a machine having a memory and at least one processor, a financial accounting entry for each one of the at least one scheduled event based on the extracted scheduled event data, the financial accounting entry comprising an electronic record of business-related activity that can be used for a financial accounting purpose, the generating the financial accounting entry comprising:
      analyzing, using the at least one processor, the text of the corresponding scheduled event using a text analysis scheme stored in a database;

determining, using the at least one processor, attribute data for the financial accounting entry based on the analysis of the text; and populating, using the at least one processor, the financial accounting entry using the determined attribute data;

receiving an indication of an adjustment to attribute data for the financial accounting entry; and modifying, by the at least one processor, the text analysis scheme stored in the database based on the indication of the adjustment.

2. The method of claim 1, wherein the financial accounting entry comprises a timesheet or an expense report.

3. The method of claim 1, wherein generating the financial accounting entry comprises populating the financial accounting entry using the time data of the corresponding scheduled event.

4. The method of claim 1, wherein the determined attribute data comprises at least one of an identification of a customer for the corresponding scheduled event and an identification of a project for the corresponding scheduled event.

5. The method of claim 4, wherein the determined attribute data comprises an identification of a customer for the corresponding scheduled event and an identification of a project for the corresponding scheduled event, and the method further comprises:

determining an identification of an employee for the corresponding scheduled event; and determining a billing rate for the corresponding scheduled event based on the identification of the employee, the identification of the customer, and the identification of the project.

6. The method of claim 1, wherein the determination of attribute data is based on a stored association between the text and the attribute data.

7. The method of claim 1, further comprising generating a forecast of business-related activity using the financial accounting entry.

8. The method of claim 7, further comprising:

receiving an indication of a modification to the electronic calendar; and modifying the forecast of business-related activity based on the indication of the modification to the electronic calendar.

9. The method of claim 8, wherein the modification to the electronic calendar comprises at least one of an addition of a scheduled event, a deletion of a scheduled event, and a modification of scheduled event data of at least one of the at least one scheduled event.

10. A system comprising:

a machine having a memory and at least one processor; and a non-transitory machine-readable medium embodying a set of instructions that, when executed by the at least one processor, cause the at least one processor to perform operations, the operations comprising:

extracting scheduled event data for at least one scheduled event from an electronic calendar, the scheduled event data comprising corresponding time data and text for each one of the at least one scheduled event;

generating a financial accounting entry for each one of the at least one scheduled event based on the extracted scheduled event data, the financial accounting entry comprising an electronic record of business-related activity that can be used for a financial accounting purpose, the generating the financial accounting entry comprising:

analyzing the text of the corresponding scheduled event using a text analysis scheme stored in a database;

determining attribute data for the financial accounting entry based on the analysis of the text; and populating the financial accounting entry using the determined attribute data;

receiving an indication of an adjustment to attribute data for the financial accounting entry; and modifying the ext analysis scheme stored in the database based on the indication of the adjustment.

11. The system of claim 10, wherein the operations further comprise populating the financial accounting entry using the time data of the corresponding scheduled event.

12. The system of claim 10, wherein the determined attribute data comprises at least one of a customer and a project for the corresponding scheduled event.

13. The system of claim 10, wherein the determination of the attribute data is based on a stored association between the text and the attribute data.

14. The system of claim 10, wherein the operations further comprise generating a forecast of business-related activity using the financial accounting entry.

15. The system of claim 14, wherein the operations further comprise:

receiving an indication of a modification to the electronic calendar; and modifying the forecast of business-related activity based on the indication of the modification to the electronic calendar.

16. A non-transitory machine-readable storage medium, tangibly embodying a set of instructions that, when executed by at least one processor, causes the at least one processor to perform operations comprising:

extracting scheduled event data for at least one scheduled event from an electronic calendar, the scheduled event data comprising corresponding time data and text for each one of the at least one scheduled event;

generating a financial accounting entry for each one of the at least one scheduled event based on the extracted scheduled event data, the financial accounting entry comprising an electronic record of business-related activity that can be used for a financial accounting purpose, the generating the financial accounting entry comprising:

analyzing the text of the corresponding scheduled event using a text analysis scheme stored in a database;

determining attribute data for the financial accounting entry based on the analysis of the text; and populating the financial accounting entry using the determined attribute data;

receiving an indication of an adjustment to attribute data for the financial accounting entry; and modifying the text analysis scheme stored in the database based on the indication of the adjustment.

* * * * *